United States Patent
Baldemair et al.

(10) Patent No.: US 8,102,754 B2
(45) Date of Patent: Jan. 24, 2012

(54) SYNCHRONIZATION TIME DIFFERENCE MEASUREMENTS IN OFDM SYSTEMS

(75) Inventors: Robert Baldemair, Solna (SE); Muhammad Ali Kazmi, Bromma (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1053 days.

(21) Appl. No.: 11/962,168

(22) Filed: Dec. 21, 2007

(65) Prior Publication Data
US 2010/0265968 A1    Oct. 21, 2010

(51) Int. Cl.
H04J 11/00    (2006.01)
(52) U.S. Cl. .................. 370/203; 370/208
(58) Field of Classification Search .......... 370/203, 370/208, 350, 310.2, 320, 321, 324, 328, 370/335, 338, 342, 349
See application file for complete search history.

(56) References Cited

U.S. PATENT DOCUMENTS

| | | | |
|---|---|---|---|
| 5,828,659 A | | 10/1998 | Teder et al. |
| 6,097,709 A | * | 8/2000 | Kuwabara ............ 370/331 |
| 6,111,919 A | | 8/2000 | Yonge, III |
| 6,151,311 A | * | 11/2000 | Wheatley et al. ....... 370/335 |
| 6,667,963 B1 | * | 12/2003 | Rantalainen et al. ..... 370/337 |
| 7,039,001 B2 | | 5/2006 | Krishnan et al. |
| 2004/0252630 A1 | | 12/2004 | Alapuranen |
| 2006/0245349 A1 | | 11/2006 | Vrcelj et al. |
| 2007/0091785 A1 | | 4/2007 | Lindoff et al. |

FOREIGN PATENT DOCUMENTS
EP    1424821 A2    6/2004
EP    1608198 A1    12/2005
WO   2006/082904 A1    8/2006

OTHER PUBLICATIONS

3GPP TR 25.814, V.7.1.0 (Sep. 2006). 3rd Generation Partnership Project; Technical Specification Group Radio Access Network; Physical layer aspects for evolved Universal Terrestrial Radio Access (UTRA) (Release 7).
3GPP TS 25.215, V.7.1.0 (Sep. 2006). 3rd Generation Partnership Project; Technical Specificatin Group Radio Access Network; Physical layer—Measurements (FDD) (Release 7).
3GPP TSG-RAN WG2 #56bis, R2-070214. "Contention and Contention-free Intra-LTE Handovers." Jan. 15-19, 2007, Sorrento, Italy.
3GPP TSG RAN WG2 #57bis, R2-071183. "Contention-free Intra-LTE handover in synchronous network." Mar. 26-30, 2007, St. Julian's, Malta.
3GPP TSG-RAN WG1 #48bis, R1-071695. "Additional UE Measurements for RRRM in E-UTRAN." Mar. 26-30, 2007, Malta.

(Continued)

*Primary Examiner* — Brenda H Pham
(74) *Attorney, Agent, or Firm* — Coats & Bennett, P.L.L.C.

(57) ABSTRACT

Disclosed herein are methods and devices for determining a received time difference between a first OFDM signal received from a first base station and a second OFDM signal received from a second base station. The methods and apparatus disclosed herein may be applied to 3GPP LTE systems as well as other OFDM-based wireless communication systems. An exemplary method comprises determining a decoding synchronization time for each of the first and second OFDM signals and calculating a time difference between the respective decoding synchronization times. The calculated time difference is transmitted by the mobile terminal to the first base station, the second base station, or both. Methods and apparatus for processing, at a base station, time difference information calculated according to the methods herein and transmitted to the base station by a mobile terminal are also presented.

21 Claims, 6 Drawing Sheets

OTHER PUBLICATIONS

Minn, H. et al. "A Robust Timing and Frequency Synchronization for OFDM Systems." IEEE Transactions on Wireless Communications, vol. 2, No. 4, Jul. 2003, pp. 822-839.

Speth, M. et al. "Frame Synchronization of OFDM Systems in Frequency Selective Fading Channels." 47th IEEE Vehicular Technology Conference, 1997. May 4-7, 1997, vol. 3, pp. 1807-1811.

Krongold, B. S. "A Method for Minimum-Interference OFDM Time Synchronization." 2003 IEEE Workshop on Signal Processing Advances in Wireless Communications, Jun. 15-18, 2003, pp. 600-604.

* cited by examiner

SYNCHRONIZATION TIME DIFFERENCE MEASUREMENTS IN OFDM SYSTEMS

CROSS REFERENCE TO RELATED APPLICATION

This application claims the benefit under 35 U.S.C. 119(a) of Swedish Application No. 0701043-2, filed Apr. 30, 2007.

BACKGROUND

1. Technical Field

The present invention generally relates to wireless communication systems, and particularly relates to signal timing measurements in an Orthogonal Frequency Division Multiplexing (OFDM) wireless communication system.

2. Background

The $3^{rd}$-Generation Partnership Project is currently developing specifications for a next generation of wireless networks, as part of the so-called Long Term Evolution (LTE) initiative. Under the current plans, Orthogonal Frequency Division Multiple Access (OFDMA) technology is used in the downlink. As will be familiar to those skilled in the art, OFDMA is a modulation scheme in which the data to be transmitted is split into several sub-streams, where each sub-stream is modulated on a separate sub-carrier. Hence in OFDMA based systems, the available bandwidth is sub-divided into several resource blocks or units as defined, for example, in 3GPP TR 25.814: "Physical Layer Aspects for Evolved UTRA". According to this document, a resource block is defined in both time and frequency. According to the current assumptions, a resource block size is 180 KHz and 0.5 ms in frequency and time domains, respectively. The overall uplink and downlink transmission bandwidth can be as large as 20 MHz.

In order to simplify equalization in the Orthogonal Frequency Division Multiplexing (OFDM) receiver, as well as to avoid inter-carrier and inter-block interference, a cyclic prefix is used, wherein each transmitted OFDM symbol is prefixed by a copy of the last samples of the OFDM symbol. The cyclic prefix provides a time-domain buffer between a current OFDM signal and the previously transmitted OFDM symbol, thus avoiding inter-block interference. In addition, the cyclic prefix effectively transforms the linear convolution performed by the radio channel into a circular convolution. As a result of this latter effect, inter-carrier interference is eliminated, and equalization of the received OFDM signal is simplified. The length of the cyclic prefix is generally selected so that it will usually exceed the delay spread of the radio propagation channel (i.e., the time difference between the first and last arriving multipath signals in the channel impulse response).

In an LTE system, a mobile terminal (in 3GPP terminology, "user equipment", or "UE") performs various measurements to facilitate radio resource management (RRM) related tasks such as contention-free handover. A measurement that can be particularly useful for contention-free handover is a time difference between a first OFDM signal, from a serving base station, and another OFDM signal from a target base station. If the time difference from the mobile terminal's perspective is known, then the network can use this information to adjust the mobile terminal's transmission timing when it accesses the target cell at handover. This ensures that the mobile terminal's transmitted signal arrives at the target cell with the proper timing, e.g., at the correct slot and frame boundaries.

Time difference information may also be useful for other applications as well. For instance, time difference information for a serving cell and each of several neighbor cells (at least two, and preferably three or more) may be used by a serving cell to estimate the mobile terminal's position, using well-known triangulation techniques.

Similar measurements are performed in Wideband Code-Division Multiple Access (WCDMA) systems. In WCDMA, a mobile station measures the arrival times of pilot symbols originating from the serving cell and possible target cells. Subsequently, the differences between the arriving time of the pilot symbol of the serving cell and pilot symbols from possible target cells are calculated. More specifically, in WCDMA there are two such measurements performed on some known channel or pilot symbols, known as SFN-SFN type 1 measurements and SFN-SFN type 2 measurements. The former measures the time difference between start of the reception of the P-CCPCH (Primary Common Control Physical Channel) from the serving cell to the start of the reception of P-CCPCH from the target cell. For SFN-SFN type 2 measurements, the mobile terminal measures the time difference between the start of the reception of the CPICH from the serving to the start of the reception of the CPICH from the target cell.

In a CDMA-based system, measuring the arrival time of pilot symbols can be done in several ways. For instance, the receiver can correlate the received signal with a pre-determined sequence that is expected in the received CDMA signal, e.g., one or more pilot symbols or synchronization signals. The arrival time can be designated as the time where the first correlation peak occurs, corresponding to the shortest path in a multipath signal environment. Alternatively, the arrival time may be designated as the time where the largest correlation peak occurs, corresponding to the arrival of the strongest path.

Referring signal arrival times to the arrival time of one ray of a multipath signal fits very well to a CDMA transmission system where the mobile terminal tries to align itself with the first received or detected path in time. However, this approach is inappropriate for OFDM based systems because individual correlation peaks have little significance in an OFDM receiver.

SUMMARY

One or more embodiments of the invention presented herein provide methods and devices for determining a received time difference between a first OFDM signal received from a first base station and a second OFDM signal received from a second base station. The methods and apparatus disclosed herein may be applied to 3GPP LTE systems as well as other OFDM-based wireless communication systems. An exemplary method comprises determining a decoding synchronization time for each of first and second OFDM signals received by a mobile terminal, calculating a time difference between the respective synchronization times, and transmitting the calculated time difference to at least one of the base stations. In some embodiments, the first OFDM signal is received from a serving base station, the second OFDM signal is received from a target base station for handover of the mobile terminal, and the calculated time difference is transmitted to the serving base station.

In some embodiments, the decoding synchronization time for each of the OFDM signals corresponds to a starting time for a Discrete Fourier Transform process. In some of these embodiments, the starting time for the DFT process is determined by estimating a channel impulse response corresponding to the respective OFDM signal and selecting the starting time based on a comparison between the estimated channel impulse response and the cyclic prefix interval. The precise starting may be determined by applying a sliding window filter to the estimated channel impulse response and selecting the starting time corresponding to a maximum output of the sliding window filter. In some embodiments, the sliding window filter may have a width equal to the cyclic prefix interval duration.

Also disclosed herein are base station apparatus and corresponding methods for processing received signal time difference information produced in accordance with the mobile terminal-based methods described herein.

Of course, the present invention is not limited to the above contexts, nor is it limited to the above features and advantages. Indeed, those skilled in the art will recognize additional features and advantages upon reading the following detailed description, and upon viewing the accompanying drawings.

DETAILED DESCRIPTION

Figure 1:
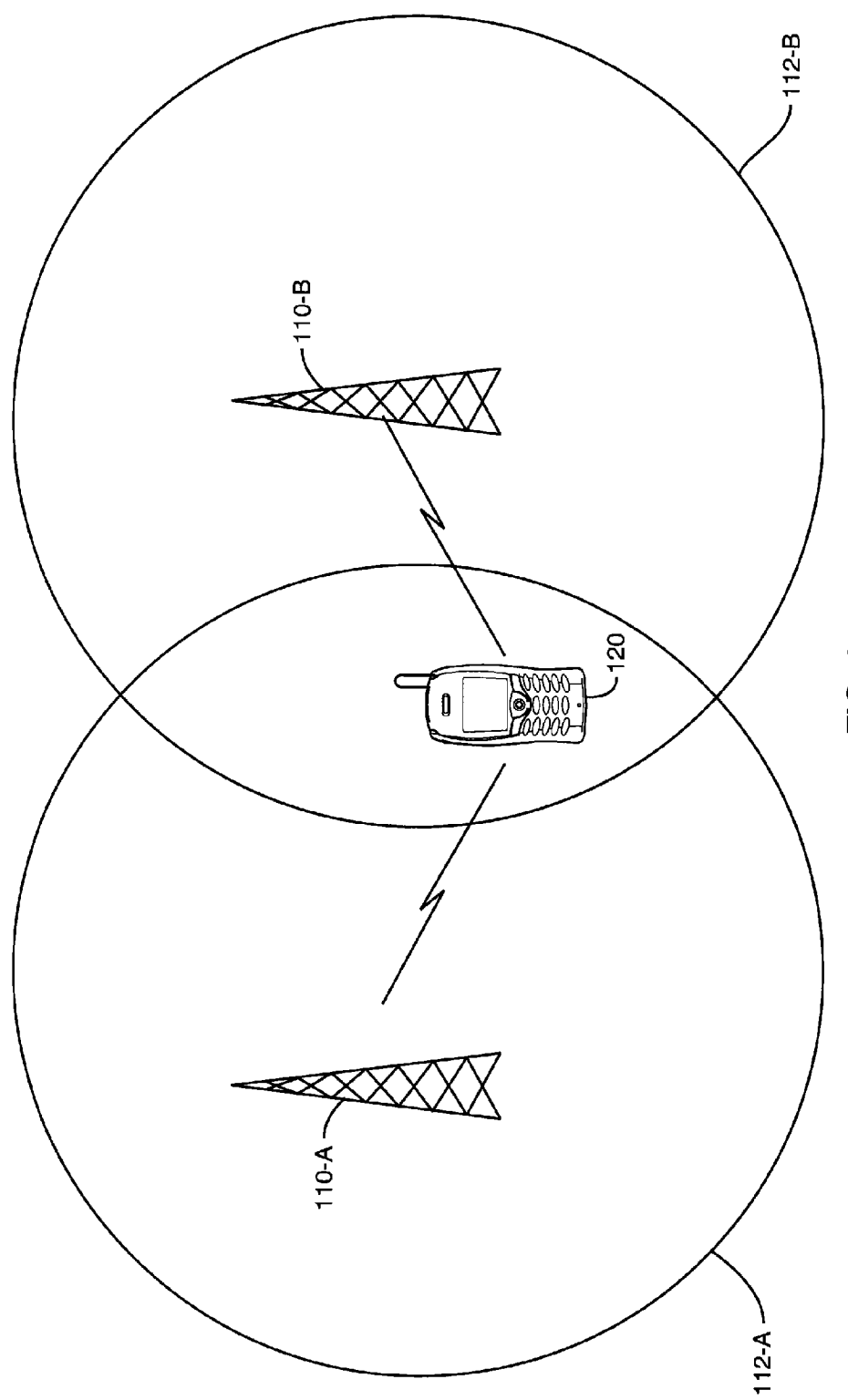
FIG. 1 is a block diagram partially illustrating a wireless communication network including an exemplary wireless communication receiver.

FIG. 1 partially illustrates a wireless communication network 100 including a first (serving) base station 110-A and a second (target) base station 110-B, corresponding to respective coverage areas 112-A and 112-B. Mobile terminal 120 is receiving signals from both base stations 110; mobile terminal 120 might be undergoing handover from base station 110-A to base station 110-B. By way of non-limiting example, wireless communication network 100 may comprise a 3GPP LTE network supporting OFDMA downlink transmissions and Single Carrier Frequency Division Multiple Access (SC-FDMA) uplink transmission. In such embodiments, each base station 110 is an Evolved NodeB (eNodeB) and mobile terminal 120 comprises a wireless communication device, such as a cellular radiotelephone, PDA (Portable Digital Assistant), pager, wireless communication card or module, etc. Of course, it should be understood that the wireless communication network 100 of FIG. 1 appears in simplified form.

As noted above, mobile station 120 may be configured to measure a time difference between signals arriving from the serving base station 110-A and the target base station 110-B. This time difference may be used in mobile station 120 to configure its receiver circuitry after handover, but it may also be reported by mobile station 120 to one or both of the base stations 110. Of course, the mobile terminal 120 can only report the time difference to the target base station 110-B after handover is completed. To facilitate the use of the time difference information at the target base station 110-B during handover, the time difference may information may be first sent by the mobile terminal to the serving base station 110-A, which may then forward the information to the target base station 110-B over a network interface, as explained more fully below. In any event, this reported information may be used generally by the network to optimize timing of transmissions and to improve inter-cell coordination. More specifically, this reported information may be used by target base station 110-B to determine an anticipated timing for an uplink transmission by mobile terminal 110 in a contention-free handover.

As noted above, in CDMA-based systems the time of arrival for a received signal may be deemed to coincide with the first-arriving component of a multipath signal, or the strongest component. Thus, the time of arrival in these systems directly corresponds to a peak in the channel impulse response. These peaks are particularly significant in a CDMA receiver employing a RAKE receiver, as signal processing delays corresponding to each "finger" of the RAKE receiver are typically set to correspond as precisely as possible to these peaks.

However, in an OFDM-based radio communication system the receiver has more degrees of freedom with respect to receiver timing. In the frequent event that the delay spread of the propagation channel is smaller than the cyclic prefix, then multiple receiver timing positions may provide optimal receiver performance. Essentially, any receiver timing that results in the cyclic prefix effectively "overlapping" the channel impulse response is acceptable. In the event that the delay spread range exceeds the cyclic prefix length, then neither the location of the first nor the strongest path may be the best synchronization instance. Instead, a better timing value in this situation would be a position where the energy "captured" by the cyclic prefix is maximized. Other approaches can be foreseen as well by those skilled in the art.

Figure 2:
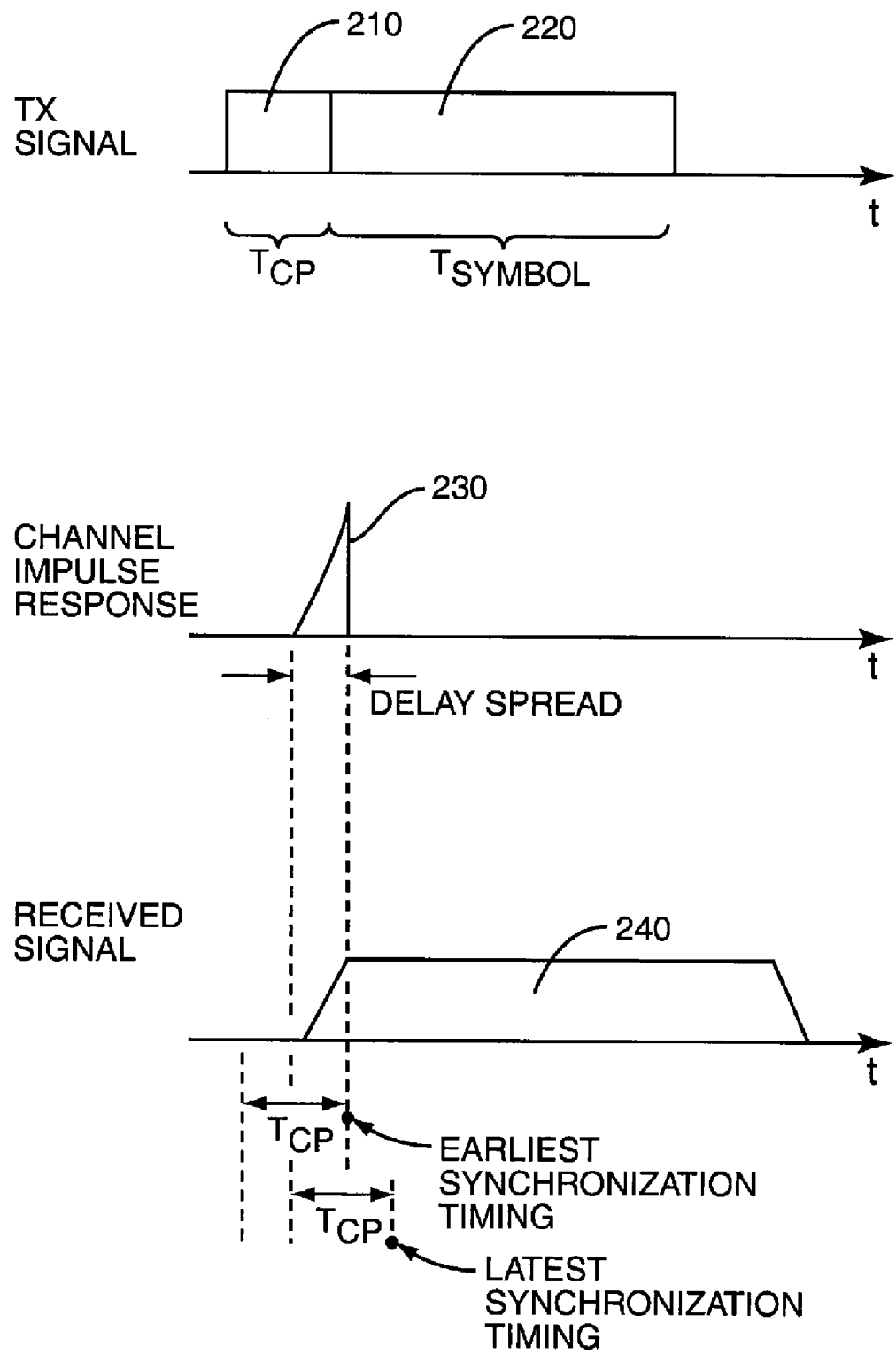
FIG. 2 illustrates the relationship between an exemplary channel impulse response and synchronization timing in one embodiment of an OFDM receiver.

FIG. 2 graphically depicts the situation where the delay spread range of the channel is smaller than the cyclic prefix. In this situation, multiple optimum timing instances exist. In FIG. 2, the transmitted signal comprises a cyclic prefix portion 210 and an OFDM symbol portion 220. FIG. 2 also shows an exemplary channel impulse response 230, here dominated by a single peak that is narrower than the cyclic prefix duration $T_{CP}$. The received signal 240 (the time-domain convolution of the transmitted signal with the channel impulse response) is also shown. As can be seen from the figure, a range of synchronization times are possible such that processing begins within the cyclic prefix portion of the received signal 240, but at a point after any potential inter-symbol interference caused by the delay spread.

Figure 3:
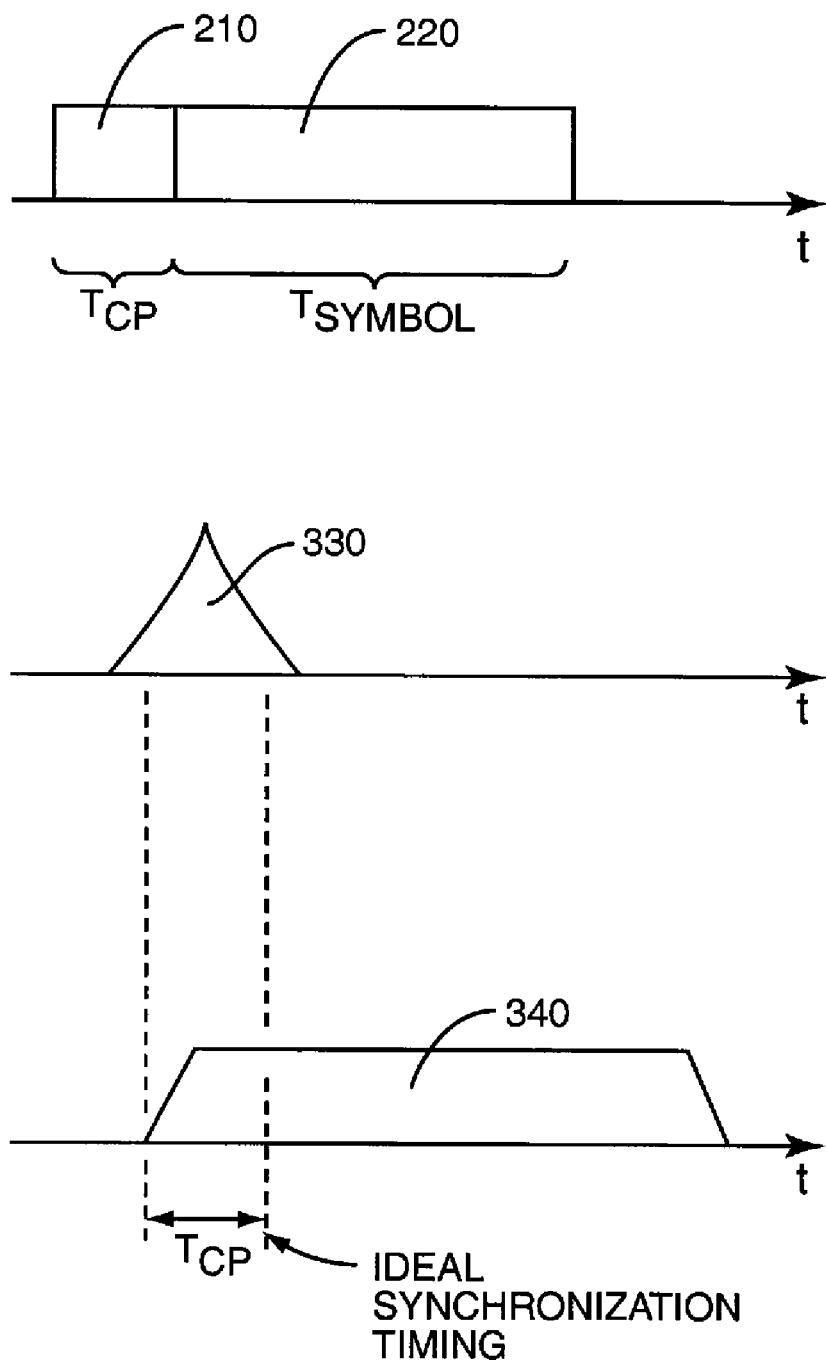
FIG. 3 illustrates the relationship between another exemplary channel impulse response and synchronization timing in one embodiment of an OFDM receiver.

In FIG. 3, corresponding signals are shown for a signal environment where the delay spread of the channel impulse response 330 exceeds the cyclic prefix duration $T_{CP}$. As noted above, in this situation neither the initial edge nor the peak of the channel impulse response 330 provide a useful reference to the optimal timing for beginning processing of the received signal 340. Rather, a synchronization time such that a window, having a width equal to the cyclic prefix and immediately preceding the synchronization time, overlaps the most "energy" of the channel impulse response curve. This point will vary depending on the precise shape of the impulse response profile. Thus, neither the first nor the strongest path necessarily provides an index to the optimum timing.

Various synchronization algorithms may be used to calculate the precise synchronization timing in a given receiver. For example, for signal environments with a wide delay spread, one algorithm might maximize the area under the channel impulse response amplitude curve that falls within the cyclic prefix "window," while another might instead adjust synchronization timing according to a channel impulse response power curve. In either event, however, the synchronization timing measurement will generally be performed in the same way for an OFDM signal from the serving base station 110-A and for an OFDM signal from the target base station 110-B.

Accordingly, a time difference calculation based on the synchronization time for receiving the OFDM signals reflects the "real" timing difference a mobile terminal experiences between two different cells. By reporting this measurement rather than a time difference based on the shortest or strongest signal path, a base station obtains a more correct view of the timing relation at a mobile station between the serving cell timing and the timing in a target cell. This helps the radio base station to improve radio resource algorithms, such as those for contention-free handover.

Those skilled in the art will appreciate that the algorithm used by a mobile station to determine the best timing generally is not standardized, but left to the discretion of the equipment designer. Thus, different terminals may calculate different synchronization times for identical signal conditions. Even the time difference calculated by two synchronization algorithms under identical conditions may differ. However, for contention-free handover it is important to know the difference between the chosen synchronization instants for two signals rather than the difference between the respective first or strongest paths, since these latter values bear no information value in an OFDM-based radio access system.

Those skilled in the art will further appreciate that it does not matter whether a timing difference is computed as the difference between the start or end of a particular OFDM symbol or cyclic prefix or synchronization signals in each of the signals. Any signal reference point that has a fixed timing relation to the frame structure may be used. Of course, in the event that the timing difference calculation is based on a synchronization referred to an event that occurs multiple times within a frame, it must be ensured that the difference is measured between corresponding events in each signal. For instance, if the synchronization signal, which may occur several times per frame, is used, the timing difference should be measured between the same instances of the synchronization signal in each signal.

Figure 4:
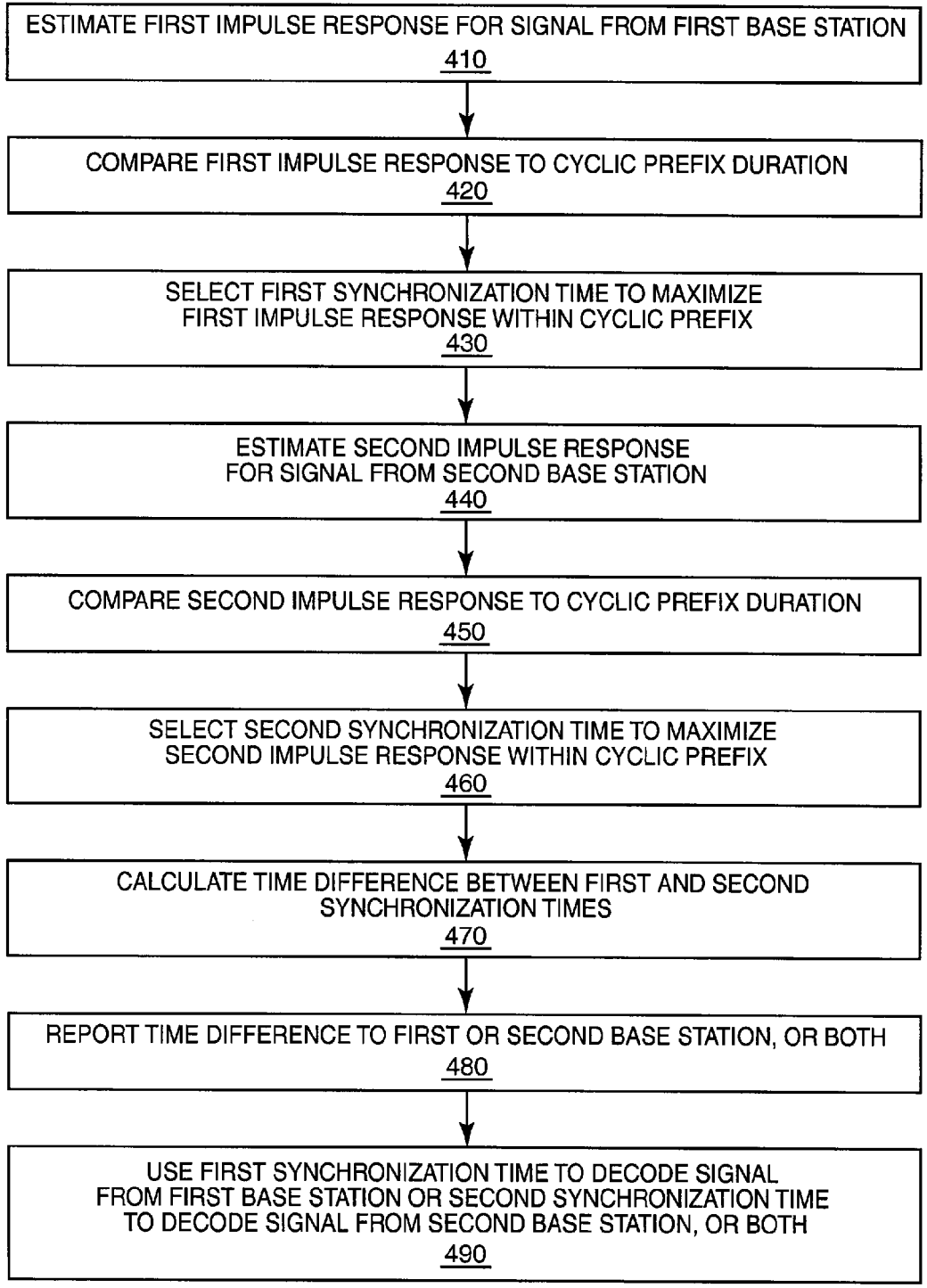
FIG. 4 is a flow diagram illustrating an exemplary method for determining a received time difference between a first OFDM signal received from a first base station and a second OFDM signal received from a second base station.

Accordingly, an exemplary method for determining a received time difference between a first OFDM signal received from a first base station 110A and a second OFDM signal received from a second base station 110B is illustrated in FIG. 4. The illustrated method, and various extensions and variations thereof may be implemented, for example, in a mobile station 120. In some embodiments, some of the steps of FIG. 4 may be performed in association with a handover procedure from the first to the second base station.

At block 410, a mobile station 120 estimates a first impulse response for the propagation channel carrying a first signal received from the first base station 110A. The channel response may be estimated according to any of a variety of conventional techniques. Typically, the channel response is estimated based on pilot symbols transmitted on some subset of the total number of OFDM sub-bands, or using synchronization signals, or based on a combination of synchronization signals and reference signals. In some embodiments, the frequency response of the propagation channel is first estimated, based on the pilot symbols, and the estimated impulse response calculated from the frequency response estimate.

At block 420, the estimated impulse response is compared to the cyclic prefix duration. As noted above, if the delay spread of the impulse response is shorter than the cyclic prefix, several synchronization times will yield essentially identical receiver performance. On the other hand, if the delay spread exceeds the cyclic prefix duration, then a more selective approach is needed to select the optimal synchronization time. Thus, at block 430, a first synchronization time is selected so that the portion of the impulse response falling within the cyclic prefix interval is maximized.

Figure 5:
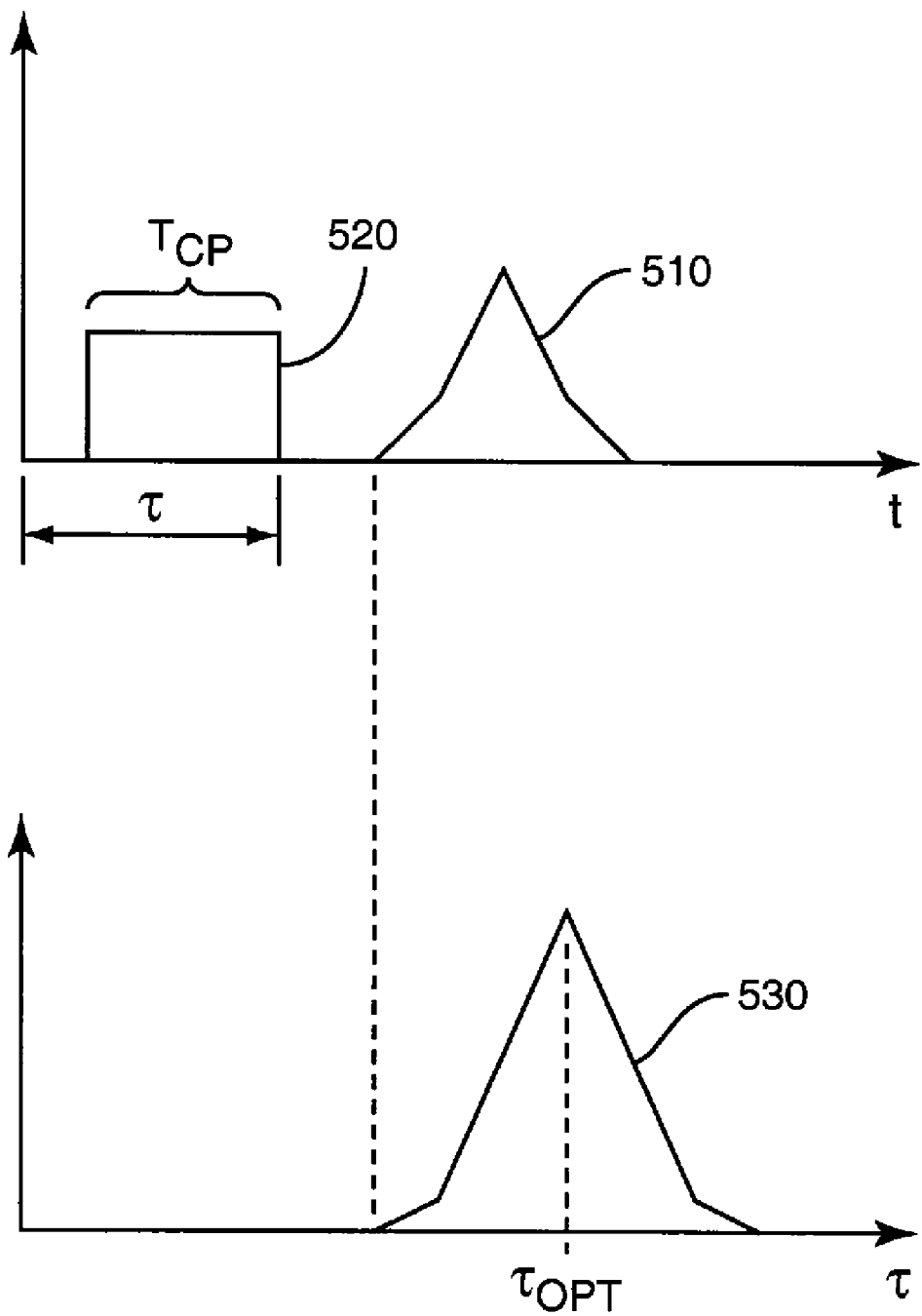
FIG. 5 illustrates an exemplary technique for determining an optimal synchronization time using a sliding window filter.

Those skilled in the art will appreciate that this maximization might be performed by applying a sliding window filter to the estimated impulse response, the sliding window filter having a length equal to the cyclic prefix duration. This is illustrated in FIG. 5, where an impulse response 510 is convolved with a window 520. The resulting optimization function 530 has a peak corresponding to the optimal synchronization time $\tau_{OPT}$. This synchronization time indicates the time at which a discrete Fourier transform (DFT), such as is typically used to decode OFDM symbols, should begin. With this synchronization time, minimal inter-symbol interference is introduced by the dispersive channel.

At blocks 440, 450, and 460, a similar process is conducted with respect to the propagation channel for a second signal received from a second base station. This measurement may be triggered in some embodiments by the determination that a handover from the first to the second base station is imminent. Those skilled in the art will appreciate that the second propagation channel may have a quite different impulse response profile compared to the first propagation channel. As discussed, the optimal synchronization timing may differ relative to a timing indexed to a first-arriving multipath signal, or the peak multipath signal.

At block 470, a time difference between the first and second synchronization times is computed. At block 480, this time difference is reported to the first base station or the second base station, or both, by transmitting a data parameter indicating the time difference. This parameter may be transmitted as part of or in association with handover-related messages.

This time difference represents the time by which receiver timing should be advanced (or delayed, as the case may be) when the receiver switches from processing signals from the first base station 110A to processing signals from the second base station 110B. In many embodiments, this time difference also represents the time difference by which signals transmitted by mobile terminal 120 to the second base station 110B should be advanced (or delayed) with respect to signals transmitted to the first base station 110A.

Finally, as shown at block 490, the first synchronization time may be used to decode signals from the first base station using conventional means. Signals from the first base station may be decoded in this manner, for instance, until handover is completed. After handover, signals from the second base station may be decoded using the second synchronization time, again according to conventional means.

Thus, according to one aspect of the invention, a mobile terminal comprises signal processing circuitry configured to determine and record a synchronization time with respect to a serving cell, and to determine and record another synchronization time with respect to another cell, which might be a target cell for handover. The mobile terminal is further configured to calculate the difference between these two times, called the synchronization time difference. In some embodiments, the mobile terminal then reports the calculated time difference to the network. For purposes of received signal processing, the synchronization time may be defined to correspond to the beginning of a specified symbol or sequence within the received signal, the specified symbol or sequence having a fixed timing relation to the overall signal structure. Likewise, the synchronization time may alternatively be defined as the end of a specified signal with a fixed timing relation within the overall signal structure. Those skilled in the art will appreciate that the synchronization time may be determined with respect to any of several physical or logical channels within the signals received from the base stations 110, including a primary synchronization channel, a secondary synchronization channel, a broadcast channel, a control channel, or the like. Those skilled in the art will further appreciate that, with respect to computing the time difference between received signals from two base stations, the same instance of the specified symbol or sequence of symbols should be used to determine the synchronization time for each of the received signals if the specified reference point occurs two or more times within a frame. Of course, synchronization time difference calculations and reporting of the measurements according to the methods described herein may be performed for multiple target cells.

Figure 6:
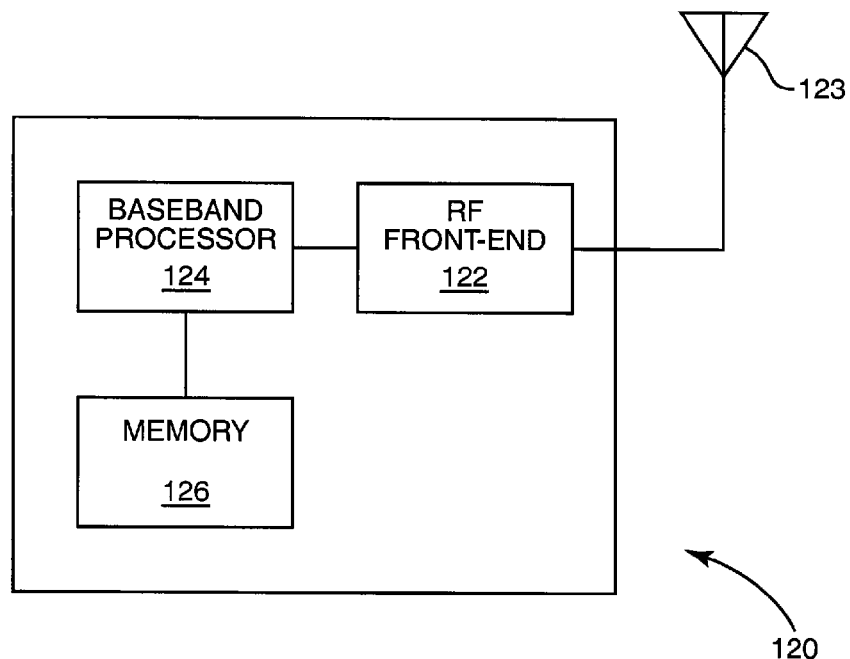
FIG. 6 illustrates an exemplary wireless communication device according to one or more embodiments of the present invention.

FIG. 6 thus provides a functional block diagram for an exemplary mobile terminal 120, configured to perform one or more of the methods described herein. Mobile terminal 120 comprises a radio frequency (RF) front end circuit 122 connected to antenna 123, a baseband processor circuit 124, and memory 126. RF front-end 122 comprises conventional radio-frequency components for receiving and sending transmissions between mobile station 120 and base stations 110. Baseband processor 124, which may comprise one or more general-purpose or customized microprocessors, microcontrollers, and or digital signal processors (DSPs), is configured using program code stored in memory 126 to record the synchronization time with respect to a serving cell and to record a second synchronization time with respect to a second cell, which may be a target cell for an imminent handover operation. Baseband processor 124 may be further configured to calculate the difference between these two synchronization times to obtain a synchronization time difference. In some embodiments, baseband processor 124 is further configured to transmit the calculated synchronization time difference to the serving cell, the target cell, or both, using the RF front-end circuitry 122 and antenna 123.

A serving base station may use the synchronization time difference reported by the mobile terminal to adjust one or more timing parameters used for received signal processing with respect to signals transmitted to the serving base station by the mobile terminal. The serving base station may also forward the reported time difference to another base station (e.g., a target base station) using, for example, the LTE/SAE X2 interface that links the serving and target base stations. A target base station receiving the reported time difference from a serving base station may use the time difference (along with other timing information) to adjust transmit timing parameter, e.g., to optimize its transmitter timing with respect to currently served mobile terminals as well as those about to be received by handover.

Further, a serving base station may use the reported time difference to estimate a mobile terminal transmit timing parameter for use by the served mobile terminal in accessing the target base station, so that the mobile terminal's transmissions to the new base station are properly aligned. After calculating the appropriate transmit timing parameter for the mobile terminal to use, the serving base station may then send the mobile terminal transmit timing parameter to the mobile terminal before it is handed over to the target base station.

Thus, according to another aspect of the invention, a first base station in an OFDM-based wireless communication system is configured to receive a synchronization time difference reported by a mobile terminal, the synchronization time difference representing the difference between synchronization times measured at the mobile terminal for a first OFDM signal, from the first base station, and a second OFDM signal, received from a second base station. Depending on the circumstances, the reported synchronization time difference may be received directly from the mobile terminal (e.g., when the first base station is serving the mobile terminal) or from the second base station via the X2 interface (e.g., when the first base station is the target of a handover from the second base station). The first base station is further configured to use the time difference to calculate a mobile terminal transmit timing parameter for use by the mobile terminal for transmitting to the second base station (e.g., when the first base station is serving the mobile terminal), or to adjust a base station transmit timing parameter for the first base station (e.g., when the first base station is a target base station for a handover of the mobile terminal), or both.

Figure 7:
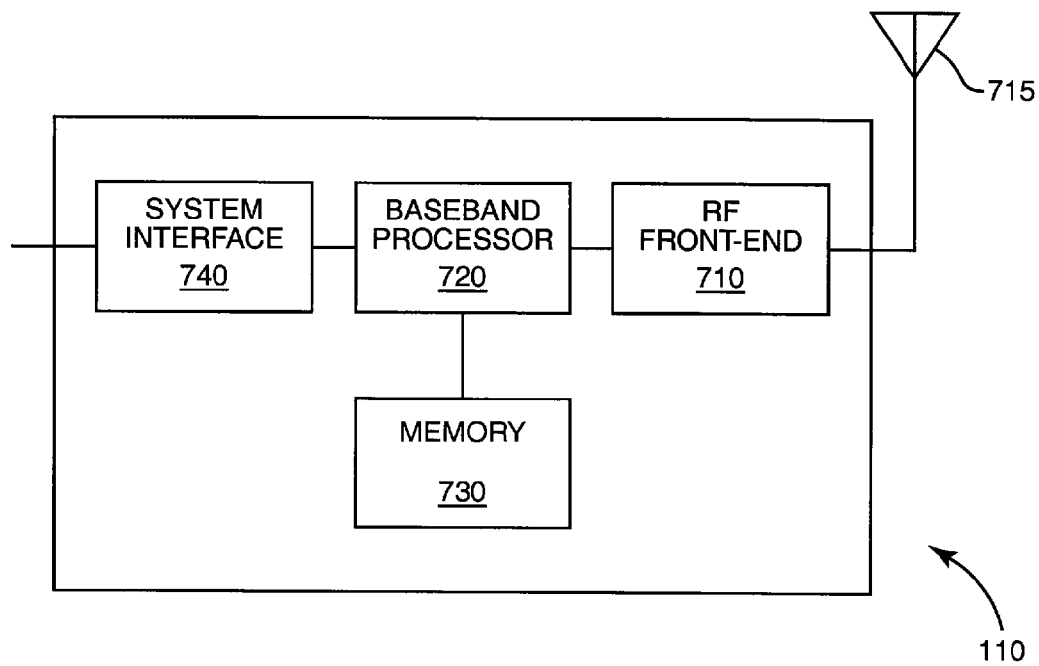
FIG. 7 illustrates an exemplary base station according to one or more embodiments of the present invention.

The base station 110, as illustrated schematically in FIG. 7, comprises RF front-end circuitry 710, connected to antenna 715, a baseband processor circuit 720, memory 730, and system interface 740. RF front-end 710 comprises a radio-frequency transceiver configured for communicating with one or several mobile terminals 120, and thus includes conventional components for receiving and sending transmissions between the target base station 110 and a mobile terminal 120. Baseband processor 720 is configured to generate one or more OFDM signals for transmission to mobile terminal 120 using RF front-end 710 and antenna 715. These one or more OFDM signals may comprise pilot symbols and/or synchronization signals for use at mobile terminal 120 in characterizing the propagation channel between base station 110 and mobile terminal 120. These pilot symbols, or other symbols in the transmitted OFDM signal, may also be used by the mobile terminal 120 to determine a synchronization time for signals received from target base station 110. This synchronization time may be compared to (e.g., subtracted from) a synchronization time for signals from another base station 110 to determine a synchronization time difference, which is transmitted to and received by the target base station 110. Baseband processor 720 is configured, using program code stored in memory 730, to use the synchronization time difference information received from the mobile terminal 120 to adjust one or more receiver timing parameters, one or more transmit timing parameters, or both. Baseband processor 720 may be further configured to send synchronization time difference information to one or more peer base stations using system interface 740, which may comprise an X2 interface to other base stations and an S1 interface to one or more access gateways, as defined by 3GPP standards for LTE systems.

With these and other variations and extensions in mind, those skilled in the art will appreciate that the foregoing description and the accompanying drawings represent non-limiting examples of the methods and devices taught herein for determining a received time difference between a first OFDM signal received by a first base station and a second OFDM signal received from a second base station, whether these methods and/or devices are implemented in an LTE wireless communication system or other wireless communication system. Accordingly, the inventive apparatus and techniques taught herein are not limited by the foregoing description and accompanying drawings. Instead, the present invention is limited only by the following claims and their legal equivalents.

What is claimed is:

1. A method in a wireless mobile terminal for determining a received time difference between a first OFDM signal received from a first base station and a second OFDM signal received from a second base station, comprising:
    determining a decoding synchronization time for each of the first and second OFDM signals;
    calculating a time difference between the decoding synchronization times; and
    transmitting a parameter indicating the time difference to the first base station.

2. The method of claim 1, wherein the first base station is a serving base station and the second base station is a target base station for handover of the mobile terminal.

3. The method of claim 1, wherein determining a decoding synchronization time comprises determining a starting time for a Discrete Fourier Transform (DFT) window.

4. The method of claim 3, wherein determining a starting time for a DFT window comprises estimating a channel impulse response corresponding to the respective OFDM signal and selecting the starting time based on a comparison between the estimated channel impulse response and the cyclic prefix interval.

5. The method of claim 4, wherein selecting the starting time based on a comparison between the estimated channel impulse response and the cyclic prefix interval comprises applying a sliding window filter to the estimated channel impulse response and selecting the starting time corresponding to a maximum output of the sliding window filter.

6. The method of claim 5, wherein the sliding window filter has a width equal to the duration of the cyclic prefix interval.

7. A mobile terminal for use in an OFDM-based wireless communication system, comprising signal processing circuitry configured to:
    determine a decoding synchronization time for each of the first OFDM signal received from a first base station and a second OFDM signal received from a second base station;
    calculate a time difference between the decoding synchronization times; and
    transmit a parameter indicating the time difference to the first base station.

8. The mobile terminal of claim 7, wherein the first base station is a serving base station and the second base station is a target base station for handover of the mobile terminal.

9. The mobile terminal of claim 7, wherein the signal processing circuitry is configured to determine a decoding synchronization time by determining a starting time for a Discrete Fourier Transform (DFT) window.

10. The mobile terminal of claim 9 wherein the signal processing circuitry is configured to determine a starting time for a DFT window by estimating a channel impulse response corresponding to the respective OFDM signal and selecting the starting time based on a comparison between the estimated channel impulse response and the cyclic prefix interval.

11. The mobile terminal of claim 10, wherein the signal processing circuitry is configured to select the starting time based on a comparison between the estimated channel impulse response and the cyclic prefix interval by applying a sliding window filter to the estimated channel impulse response and selecting the starting time corresponding to a maximum output of the sliding window filter.

12. The mobile terminal of claim 11, wherein the sliding window filter has a width equal to the duration of the cyclic prefix interval.

13. A first base station for use in an OFDM-based wireless communication system, comprising
    a radio frequency transceiver, and
    signal processing circuitry configured to:
        receive a time difference parameter, via the radio frequency transceiver, from a mobile terminal served by the first base station, the time difference parameter indicating a time difference between a first decoding synchronization time corresponding to a first OFDM signal received by the mobile terminal from the first base station and a second decoding synchronization time corresponding to a second OFDM signal received by the mobile terminal from a second base station; and
        use the time difference to adjust a base station transmit timing parameter for the first base station or to calculate a mobile terminal transmit timing parameter for use by the mobile terminal for transmitting to the second base station, or both.

14. The first base station of claim 13, wherein the first base station comprises a system interface configured for communication with the second base station, and wherein the signal processing circuitry is further configured to send the time difference parameter to the second base station via the system interface.

15. The first base station of claim 13, wherein the signal processing circuitry is further configured to send the mobile terminal transmit timing parameter to the mobile terminal, via the radio frequency transceiver.

16. A first base station for use in an OFDM-based wireless communication system, comprising
    a system interface for communication with a second base station serving a mobile terminal, and
    signal processing circuitry configured to:
        receive a time difference parameter, via the system interface, from the second base station, the time difference parameter indicating a time difference between a first decoding synchronization time corresponding to a first OFDM signal received by the mobile terminal from the first base station and a second decoding synchronization time corresponding to a second OFDM signal received by the mobile terminal from a second base station; and
        use the time difference to adjust a base station transmit timing parameter for the first base station or to calculate a mobile terminal transmit timing parameter for use by the mobile terminal for transmitting to the first base station after a handover of the mobile terminal, or both.

17. A method in a first base station for processing time difference information, comprising:
    receiving a time difference parameter reported by a mobile terminal, the time difference parameter indicating a time difference between a first decoding synchronization time corresponding to a first OFDM signal received by the mobile terminal from the first base station and a second decoding synchronization time corresponding to a second OFDM signal received by the mobile terminal from a second base station; and
    using the time difference to calculate a mobile terminal transmit timing parameter for use by the mobile terminal for transmitting to the second base station, or to adjust a base station transmit timing parameter for the first base station, or both.

18. The method of claim 17, wherein the first base station is a target base station for handover of the mobile terminal, and wherein receiving a time difference parameter reported by a mobile terminal comprises receiving the time difference parameter from the second base station, via a system interface configured for communication with the second base station.

19. The method of claim 17, wherein the first base station is serving the mobile terminal and wherein receiving a time difference parameter reported by a mobile terminal comprises receiving the time difference parameter from the mobile terminal, via a radio transceiver in the first base station.

20. The method of claim 19, wherein the second base station is a target base station for handover of the mobile terminal, further comprising sending the time difference parameter to the second base station via a system interface configured for communication with the second base station.

21. The method of claim 19, further comprising transmitting the mobile terminal transmit timing parameter to the mobile terminal.

* * * * *